(12) United States Patent
Merchant et al.

(10) Patent No.: US 8,087,491 B2
(45) Date of Patent: Jan. 3, 2012

(54) VANE TYPE SILENCERS IN ELBOW FOR GAS TURBINE

(75) Inventors: Laxmikant Merchant, Bangalore (IN); Dinesh Setty Venugopal, Balgalore (IN); Rajesh Saraswathi Prabhakaran, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/684,161

(22) Filed: Jan. 8, 2010

(65) Prior Publication Data

US 2011/0168482 A1    Jul. 14, 2011

(51) Int. Cl.
*F01N 1/08*    (2006.01)
*F02K 1/00*    (2006.01)
*F03D 11/00*    (2006.01)
*E04F 17/04*    (2006.01)
*B64F 1/26*    (2006.01)

(52) U.S. Cl. ...................................... 181/224
(58) Field of Classification Search .................. 181/213, 181/224, 268, 217, 218; 415/115, 119
See application file for complete search history.

(56) References Cited

U.S. PATENT DOCUMENTS

| | | | |
|---|---|---|---|
| 2,874,627 A * | 2/1959 | Simmonds ................ | 126/299 D |
| 3,011,584 A * | 12/1961 | Lemmerman et al. ........ | 181/217 |
| 3,174,581 A * | 3/1965 | Duthion et al. ............... | 181/217 |
| 3,187,835 A * | 6/1965 | Smith ........................... | 181/217 |
| 3,511,336 A | 5/1970 | Rink et al. | |
| 3,698,509 A | 10/1972 | Fitting et al. | |
| 3,704,762 A | 12/1972 | Smith et al. | |
| 3,709,319 A | 1/1973 | Lawyer et al. | |
| 3,715,009 A * | 2/1973 | Smith et al. ................... | 181/218 |
| 3,739,872 A * | 6/1973 | McNair ......................... | 181/218 |
| 3,762,498 A | 10/1973 | May et al. | |
| 4,050,237 A | 9/1977 | Pall et al. | |
| 4,105,089 A | 8/1978 | Judd | |
| 4,131,432 A | 12/1978 | Sato et al. | |
| 4,180,141 A | 12/1979 | Judd | |
| 4,371,054 A | 2/1983 | Wirt | |
| 4,537,277 A | 8/1985 | Bryce | |
| 4,581,048 A * | 4/1986 | Svoboda ......................... | 55/307 |
| 4,738,585 A * | 4/1988 | von Bockh .................... | 415/115 |
| 4,753,319 A | 6/1988 | Vinciguerra | |
| 5,355,074 A | 10/1994 | Nakano | |
| 5,495,754 A * | 3/1996 | Starr et al. ....................... | 73/147 |
| 5,713,196 A | 2/1998 | Uekusa et al. | |
| 5,715,672 A | 2/1998 | Schockemoehl et al. | |
| 5,809,770 A | 9/1998 | Jahn | |
| 6,260,658 B1 | 7/2001 | Darrell et al. | |
| 6,290,266 B1 * | 9/2001 | Kawano ...................... | 285/125.1 |
| 6,397,759 B1 | 6/2002 | Hubert et al. | |
| 6,520,286 B1 | 2/2003 | Frederiksen et al. | |
| 6,537,490 B2 | 3/2003 | Han | |
| 6,640,926 B2 * | 11/2003 | Weinstein ..................... | 181/224 |
| 6,668,540 B2 * | 12/2003 | Nishimura et al. ............ | 60/39.5 |
| 6,725,912 B1 * | 4/2004 | Moll et al. ..................... | 165/144 |
| 6,748,734 B1 | 6/2004 | Coleman et al. | |
| 6,802,690 B2 * | 10/2004 | Han et al. ...................... | 415/119 |

(Continued)

*Primary Examiner* — Elvin G Enad
*Assistant Examiner* — Christina Russell
(74) *Attorney, Agent, or Firm* — Nixon & Vanderhye P.C.

(57) ABSTRACT

A silencer for a gas turbine includes a first duct portion; a second duct portion connected to the first duct portion, the first and second duct portions forming an elbow region at the connection; and a plurality of elbow shaped vanes provided in the elbow region. The plurality of elbow shaped vanes have equal lengths and are spaced equally apart.

20 Claims, 8 Drawing Sheets

U.S. PATENT DOCUMENTS

| | | |
|---|---|---|
| 6,851,514 B2 | 2/2005 | Han et al. |
| 7,048,500 B2 | 5/2006 | Cuvelier et al. |
| 7,051,534 B2 | 5/2006 | Sandberg et al. |
| 7,104,749 B2 | 9/2006 | Frutschi |
| 7,191,598 B2 | 3/2007 | Coleman et al. |
| 7,600,605 B2 * | 10/2009 | Roark et al. .................. 181/210 |
| 2002/0084138 A1 * | 7/2002 | Weinstein .................... 181/268 |
| 2003/0072648 A1 * | 4/2003 | Han et al. ..................... 415/119 |
| 2004/0103667 A1 | 6/2004 | Frutschi |
| 2004/0238271 A1 * | 12/2004 | Han et al. ..................... 181/224 |

\* cited by examiner

VANE TYPE SILENCERS IN ELBOW FOR GAS TURBINE

The invention relates generally to noise suppression techniques, and more particularly to systems and methods that provide improved sound attenuaton properties. More particularly, the invention relates to silencers for ducts, including inlet and exhaust ducts, of a gas turbine.

BACKGROUND OF THE INVENTION

The environmental noise caused by airplanes, automobiles, and other modern machinery can often be an annoyance. To maintain noise below acceptable levels, noise suppression techniques are often employed. Noise suppression has, therefore, become a technology with a wide variety of industrial and residential applications. Noise suppression devices are often applied in heating, ventilation and air conditioning (HVAC) systems, industrial machinery and complexes, transportation vehicles, and any machinery that may tend to produce unacceptably high levels of noise.

In gas turbines, parallel baffle silencers are mounted in the inlet and exhaust ducts to achieve required acoustic performance. A certain duct length for inlet and exhaust is required to accommodate these silencers. The overall pressure loss in this arrangement from the face of silencer to an end of an elbow is the sum of frictional, entry and exit losses of the silencer and turning losses in the elbow. Two stages of silencers may be used in the elbow. A first stage may be used to attenuate low and mid range frequencies. The second stage may be provided to attenuate high frequencies. Alternatively, only one stage may be used in the exhaust duct to attenuate some frequencies. The use of parallel baffle silencers results in longer inlet and exhaust ducts. The overall pressure in the inlet and exhaust ducts tends to be high.

BRIEF DESCRIPTION OF THE INVENTION

According to one embodiment of the invention, a silencer for a gas turbine comprises a first duct portion; a second duct portion connected to the first duct portion, the first and second duct portions forming an elbow region at the connection; and a plurality of elbow shaped vanes provided in the elbow region, wherein the plurality of elbow shaped vanes have equal lengths and are spaced equally apart.

According to another embodiment of the invention, a silencer for a gas turbine comprises a first duct portion; a second duct portion connected to the first duct portion, the first and second duct portions forming an elbow region at the connection; and a plurality of parallel L-shaped shaped baffles provided in the elbow region, wherein the plurality of L-shaped baffles have equal lengths and are spaced equally apart.

DETAILED DESCRIPTION OF THE INVENTION

Figure 1:
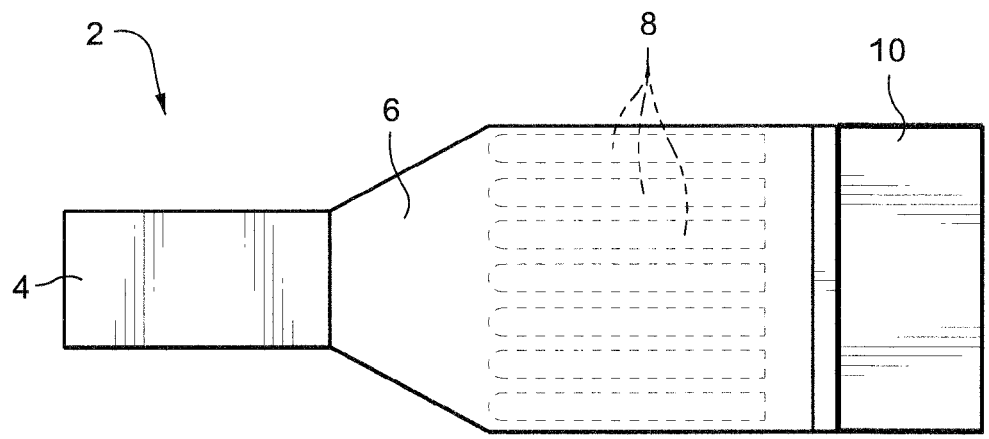
FIG. 1 schematically depicts a plan view of an exhaust duct for a gas turbine according to the prior art.

Referring to FIG. 1, an exhaust duct 2 according to the prior art includes an exhaust duct inlet 4 and an exhaust chimney 10. A transition 6 is provided between the exhaust duct inlet 4 and the exhaust chimney 10. Parallel silencer baffles 8 are provided after the transition 6 and prior to the exhaust chimney 10.

Figure 2:
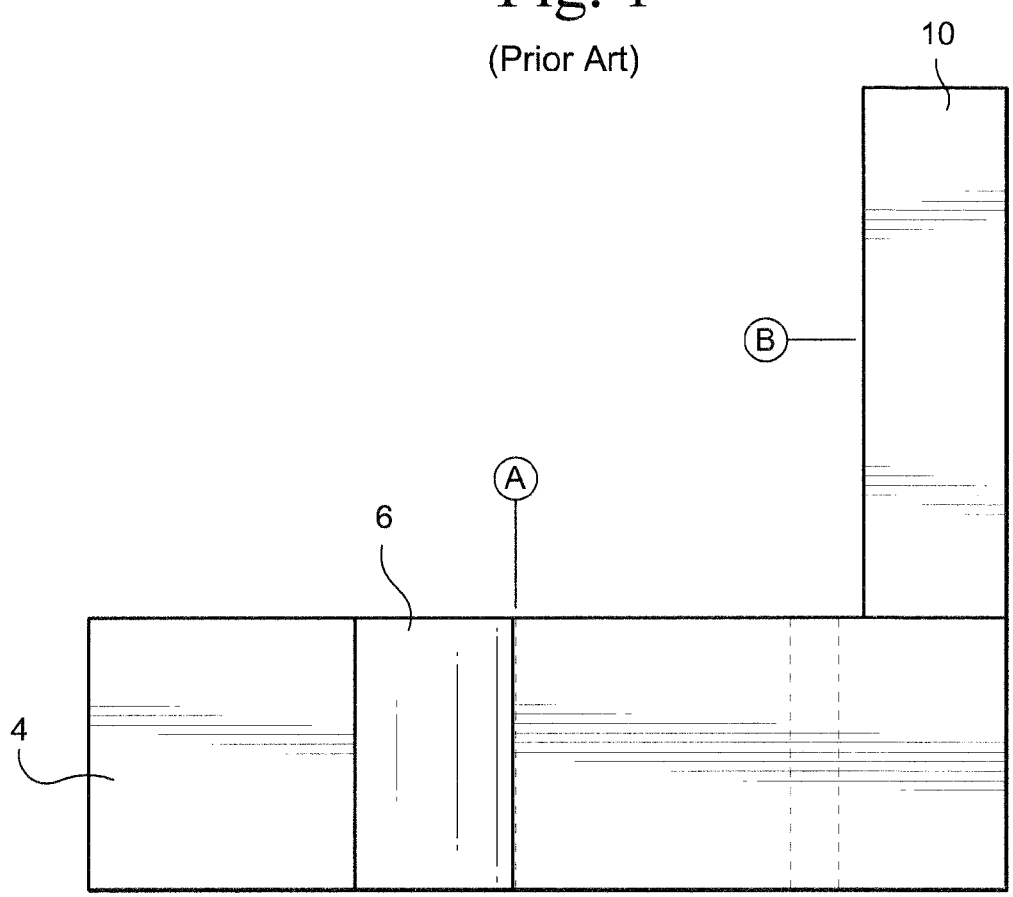
FIG. 2 schematically depicts a side view of the exhaust duct of FIG. 1.

As shown in FIG. 2, the exhaust duct 2 has the general shape of an elbow. The exhaust duct 2 includes a generally horizontal portion and a generally vertical portion. The generally horizontal portion includes the inlet 4, the transition 6, and the parallel silencer baffles 8. The vertical portion comprises the exhaust chimney 10.

The overall pressure loss in the exhaust duct 2 of the prior art from the exhaust duct inlet 4 to the outlet of the exhaust chimney 10 is the sum of frictional, entry and exit losses of the parallel silencer baffles 8 and turning losses in the elbow.

Figure 3:
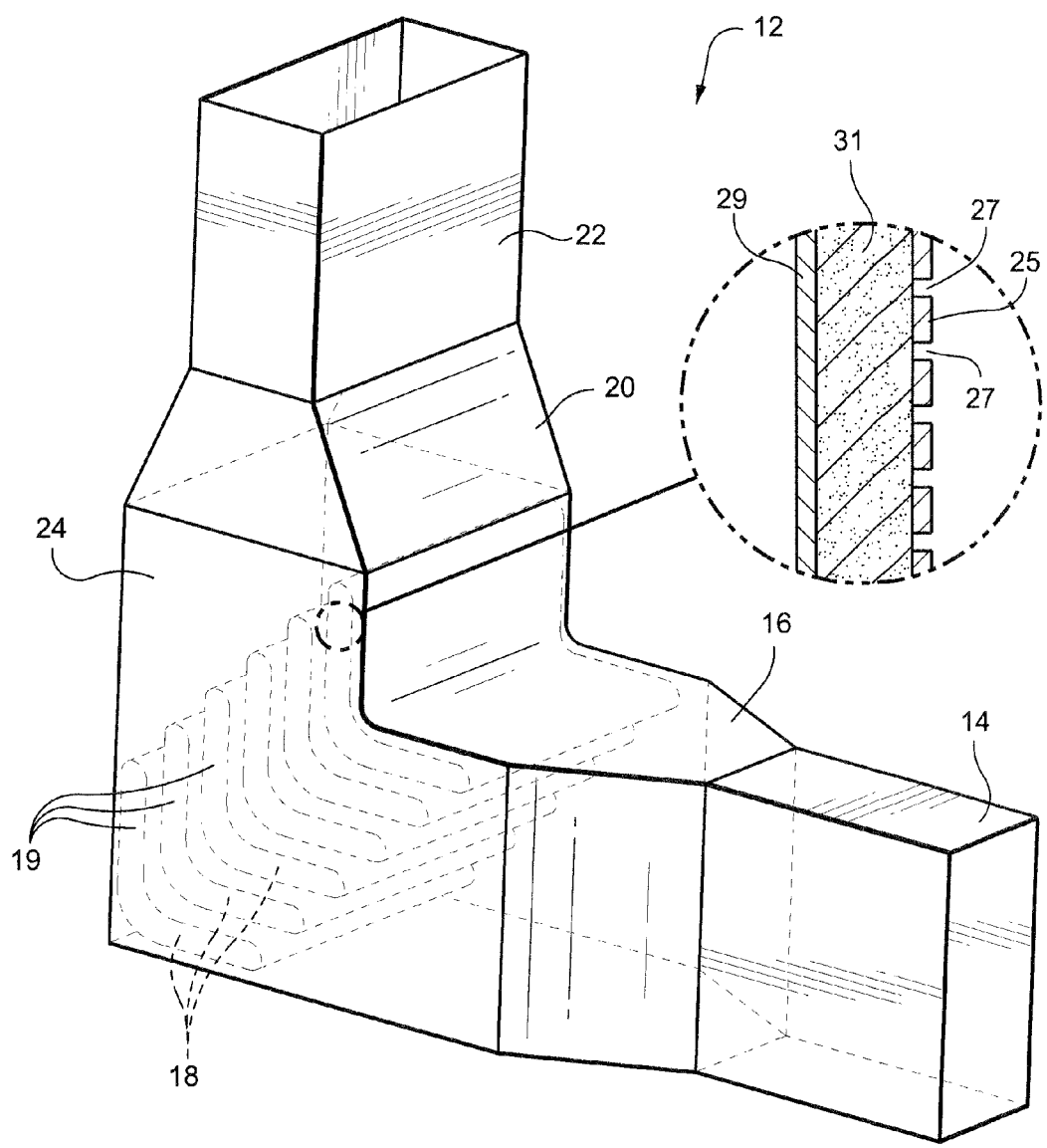
FIG. 3 schematically depicts a perspective view of an exhaust duct according to an embodiment of the invention.
Figure 4:
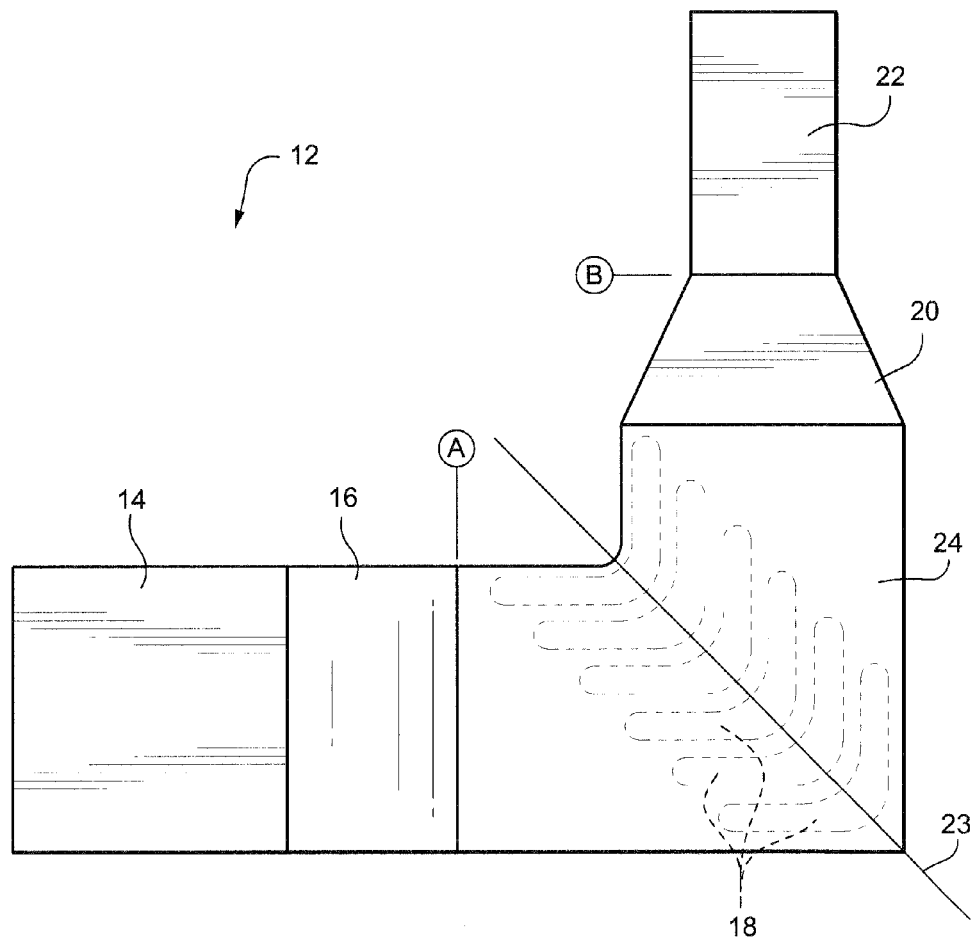
FIG. 4 schematically depicts a side view of the exhaust duct of FIG. 3.
Figure 5:
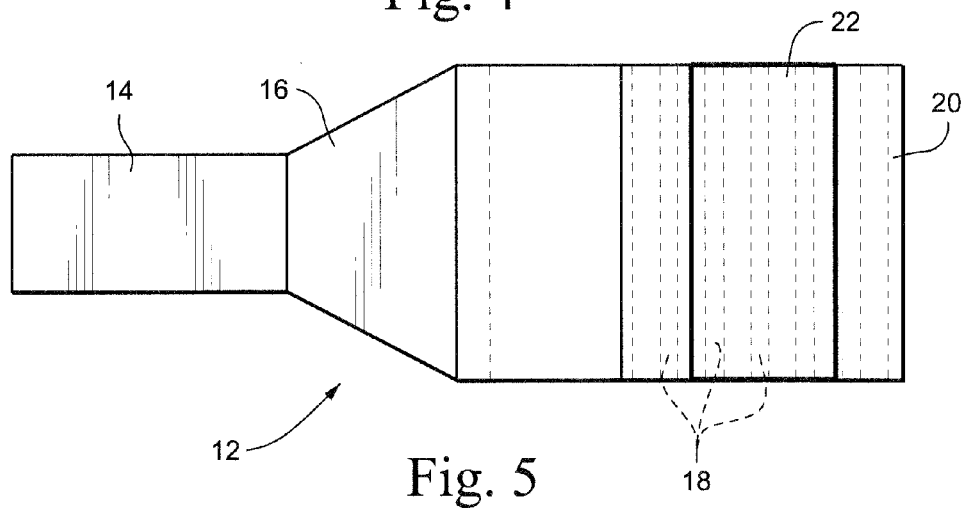
FIG. 5 schematically depicts a plan view of the exhaust duct of FIG. 3.

Referring to FIGS. 3-5, an exhaust duct 12 in accordance with an embodiment of the invention includes an exhaust duct inlet 14 followed by an inlet transition 16. A plurality of silencer guide vanes 18 are provided in the elbow of the exhaust duct 12. The silencer vanes 18 are followed by an outlet transition 20 and an exhaust chimney 22. The exhaust duct 12 includes side walls 24. The side walls 24 may have slots 19 through which the silencer guide vanes 18 are inserted into the exhaust duct 12.

Referring to FIG. 4, the exhaust duct 12 according to this embodiment of the invention has a reduced duct surface area and duct length (i.e. footprint) from the point A at the end of the end of the inlet transition 16 to the point B at the end of the outlet transition 20 than the duct surface area and the duct length from the point A to the point B of the exhaust duct 2 shown according to the prior art in FIG. 2.

As shown in FIGS. 3-5, the exhaust duct 12 includes fewer silencer guide vanes 18 in contrast to the number of parallel silencer baffles 8 of the prior art exhaust duct 2 of FIG. 1. For example, the exhaust duct 12 according to this embodiment may have six silencer guide vanes 18 whereas the prior art exhaust duct 2 may have seven parallel silencer baffles 8. The silencer guides vanes 18 of FIGS. 3-5 provide an open area and a blockage which is equal to the open area and blockage of the exhaust duct 2 of the prior art shown in FIGS. 1 and 2. However, the exhaust duct 12 of the embodiment of FIGS. 3-5 provides the open area and blockage with a duct surface area and duct length that is less than the prior art, as discussed above.

As shown in detail in FIG. 3, each silencer vane 18 comprises sheet material 25, 29 that encloses sound attenuating material 31. The sheet material 25, 29 may be, for example, sheet metal. The sound attenuating material 31 may be, for example, fiberglass or foam. The surface of the sheet 25 in contact with the flow in the duct 12 may comprise perforations 27. Although two sheets are shown, it should be appreciated that each silencer vane may be formed of a single sheet.

Referring to FIG. 4, each silencer vane 18 is generally elbow or L-shaped. The silencer vanes 18 each have equal lengths, i.e. the distance from the front edge of the vane in the horizontal duct to the back edge of the vane in the vertical duct. The silencer vanes 18 are spaced so as to provide an equal flow gap between the silencer vanes 18. The silencer vanes 18 may also be placed about a line of symmetry 23 such that each silencer vane 18 has equal extension in the horizontal and vertical ducts. It should be appreciated however that the silencer vanes 18 may be configured to have unequal extension into the horizontal and vertical ducts.

The provision of equal length and equally spaced silencer vanes provides uniform attenuation of sound compared to vanes of unequal lengths. The equal length and equally spaced silencer vanes also reduce turning losses, i.e. pressure drops, in the elbow compared to vanes of unequal length. Providing equal length and equally spaced silencer vanes reduces the amount of sound attenuating material compared to vanes of unequal length.

Figure 6:
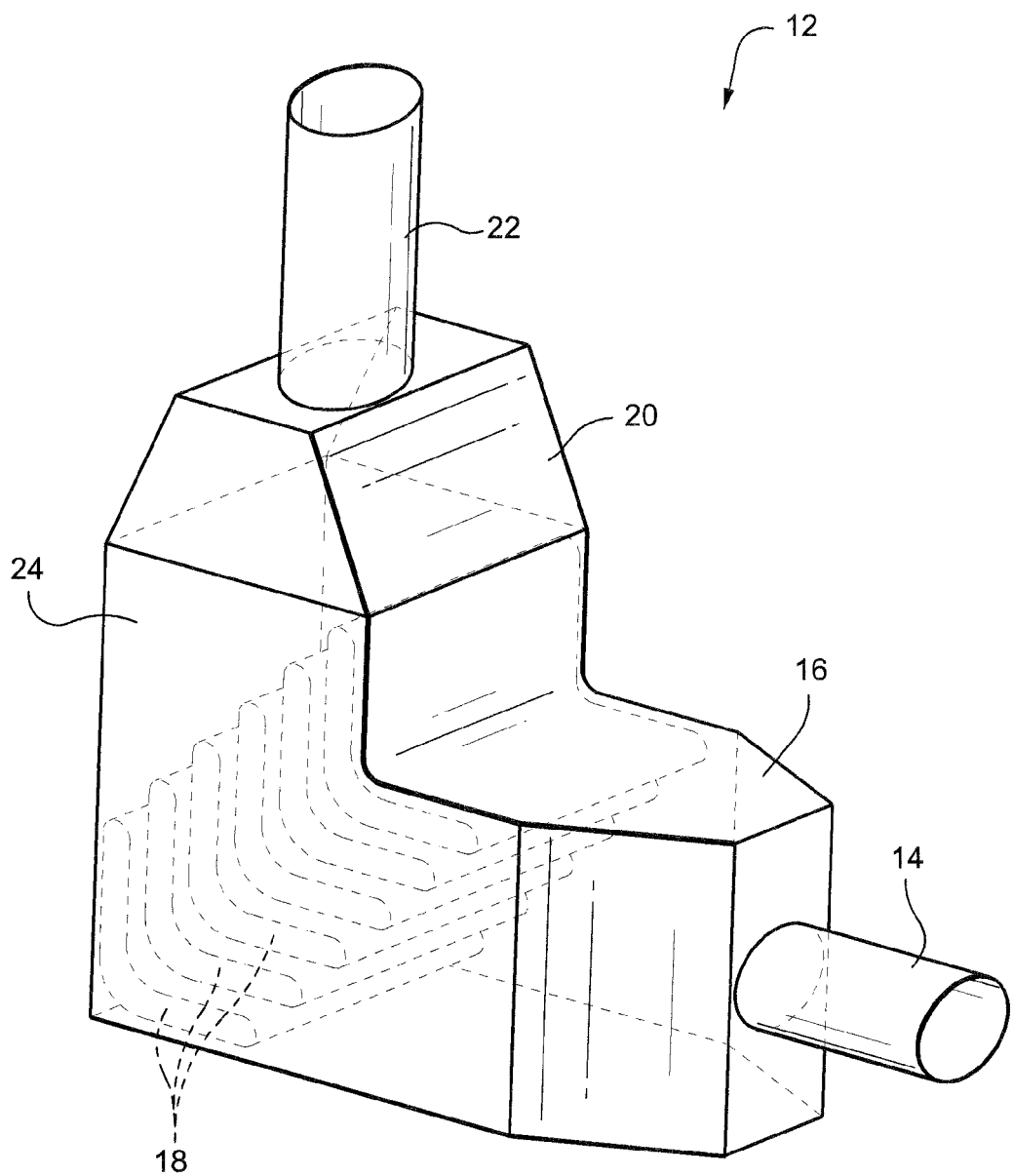
FIG. 6 schematically depicts a perspective view of an exhaust duct according to another embodiment of the invention.

Referring to FIG. 6, according to another embodiment of the invention, an exhaust duct 12 may comprise an inlet 14 and an exhaust chimney 22 that are configured as circular ducts.

Figure 7:
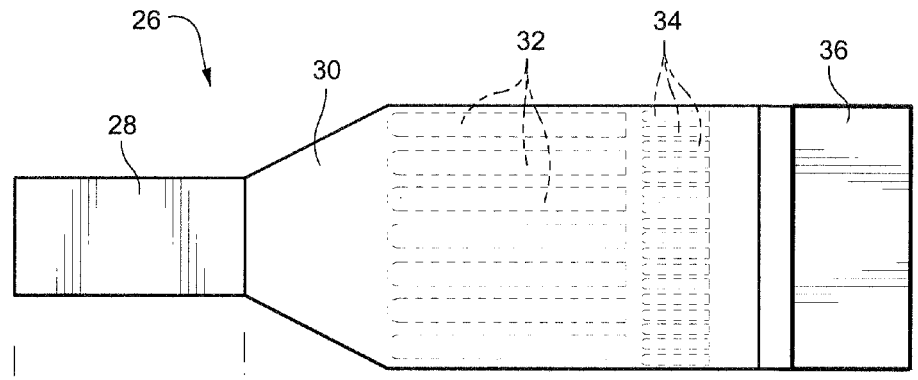
FIG. 7 schematically depicts a plan view of an exhaust duct according to the prior art.

Referring to FIG. 7, an exhaust duct 26 according to the prior art comprises an exhaust duct inlet 28 and an inlet transition 30 following the inlet 28. A plurality of first parallel silencer baffles 32 are provided after the inlet transition to dampen or silence, low frequencies in the exhaust duct. A plurality of second parallel silencer baffles 34 are provided after the first silencer baffles 32 to dampen or silence high frequencies in the exhaust duct 26. The second silencer baffles 34 are followed by an exhaust chimney 36.

Figure 8:
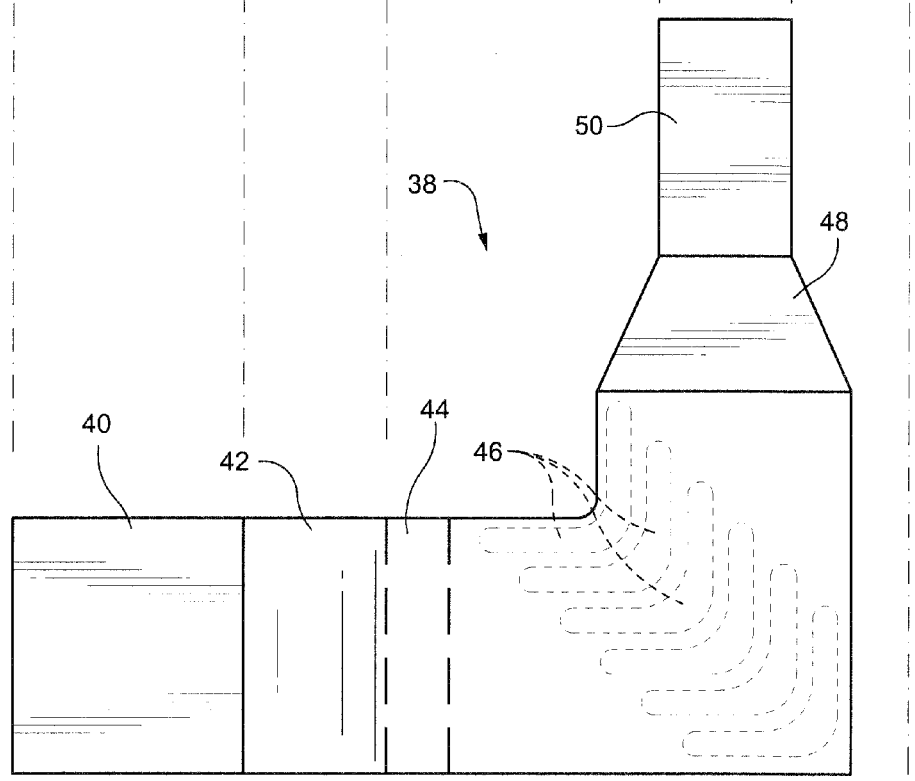
FIG. 8 schematically depicts a side view of an exhaust duct according to another embodiment of the invention.

Referring to FIG. 8, an exhaust duct 38 according to another embodiment of the invention includes an exhaust duct inlet 40 followed by an inlet transition 42. As shown in FIGS. 7 and 8, the inlet transition 42 according to this embodiment of the invention shown in FIG. 8 may have the same length as the inlet transition 30 of the exhaust duct 26 of the prior art shown in FIG. 7. The inlet transition 42 according to this embodiment of the invention may be followed by a horizontal stage 44 which is followed by the plurality of silencer guide vanes 46. The silencer guide vanes 46 are followed by an outlet transition 48 which is followed by an exhaust chimney 50. As shown in FIG. 8, the exhaust duct 38 has a shorter overall duct length compared to the prior art duct 26 shown in FIG. 7

The horizontal stage 44 may be provided to attenuate high frequency noise. The horizontal stage 44 may be provided in the horizontal duct with the vane type silencers 46 in the elbow in situations in which very stringent requirements on sound levels are required. The horizontal stage provides the benefit of relocating the first stage from the horizontal duct to the elbow, thereby providing reduction in pressure loss (gain in power output) and duct cost savings.

Figure 9:
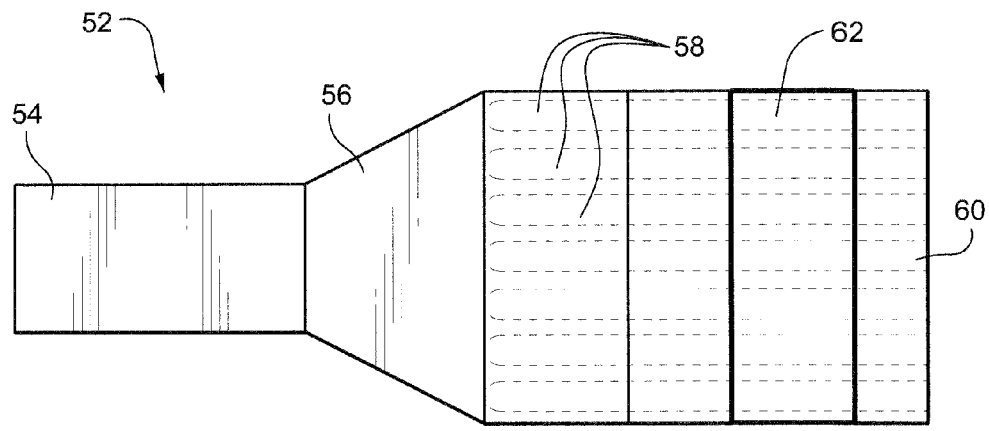
FIG. 9 schematically depicts a plan view of an exhaust duct according to another embodiment of the invention.
Figure 10:
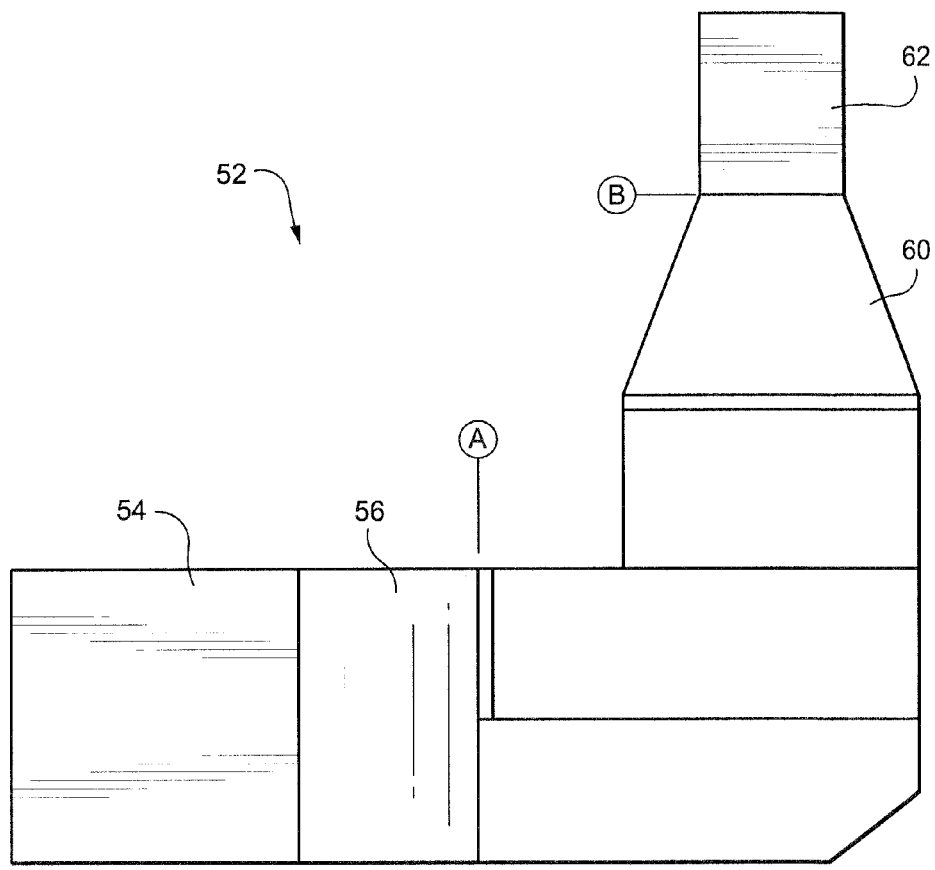
FIG. 10 schematically depicts a side view of the exhaust duct of FIG. 9.

Referring to FIGS. 9 and 10, an exhaust duct 52 according to another embodiment of the invention includes an exhaust duct inlet 54 followed by an inlet transition 56. A plurality of parallel elbow or L-shaped silencer baffles 58 follow the inlet transition 56. An outlet transition 60 is provided after the silencer baffles 58 and followed by an exhaust chimney 62. As shown in FIG. 9, the parallel elbow or L-shaped silencer baffles 58 extend in the horizontal duct of the elbow to a position below and beyond the exhaust chimney 62. The configuration of parallel elbow or L-shaped silencer baffles 58 shown in FIGS. 9 and 10 maintains the same gap-velocity across the silencer as the embodiment shown in FIGS. 3-5. As shown in FIGS. 9 and 10, the exhaust duct 52 according to this embodiment also provides a reduction in duct surface area and the duct length from the points A to B than in the prior art arrangement shown in FIGS. 1 and 2.

Figure 11:
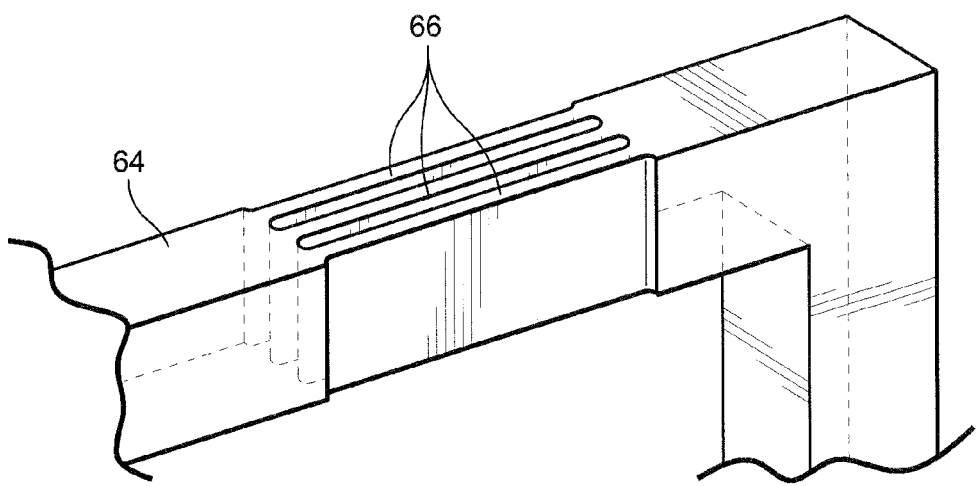
FIG. 11 schematically depicts silencer baffles in a duct according to the prior art.
Figure 12:
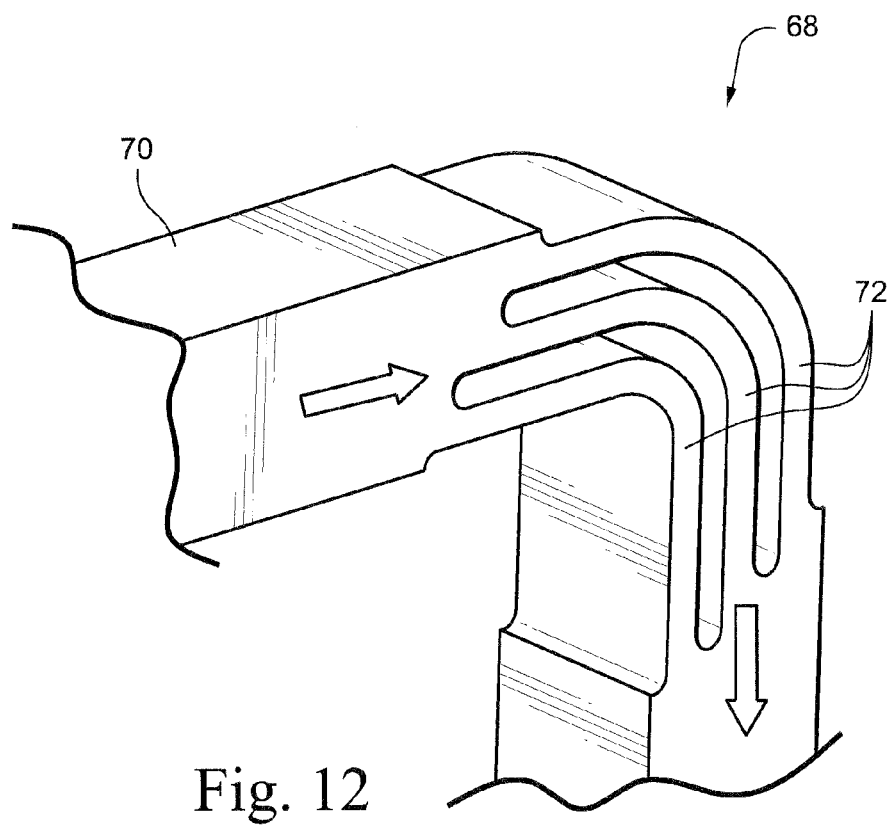
FIG. 12 schematically depicts a perspective view of a duct elbow including silencer vanes according to another embodiment of the invention.

Referring to FIG. 11, an inlet or outlet duct 64 according to the prior art includes a plurality of parallel silencer baffles 66. As shown in FIG. 12, an inlet duct 70 according to an embodiment of the invention includes an inlet duct elbow 68 having a plurality of silencer guide vanes 72 provided in the elbow 68. The silencer guide vanes 72 may have the same length as the parallel silencer baffles 66 of the prior art duct 64 shown in FIG. 11. By providing the silencer guide vanes 72 in the elbow 68, the duct length may be reduced. In addition, the silencer guide vanes 72 provide guided flow in the inlet duct elbow 68 and reduce the pressure loss due to the combination of silencer and elbow losses. The silencer vanes 72 also block the direct line of sight of sound waves and provide higher sound attenuation and insertion loss.

Figure 13:
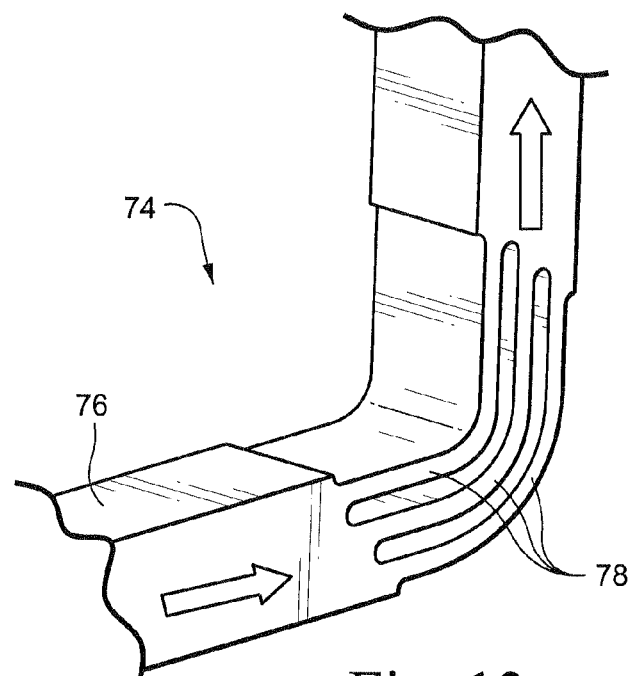
FIG. 13 schematically depicts a perspective view of a duct elbow including silencer vanes according to another embodiment of the invention.

Referring to FIG. 13, an exhaust duct elbow 74 according to an embodiment of the invention comprises an exhaust duct 76 and a plurality of silencer guide vanes 78 provided in an elbow of the exhaust duct.

The inlet and exhaust ducts 70, 74 of FIGS. 12 and 13 may be used in all up and forward inlet and exhaust ducts in the gas turbine cycle.

Figure 14:
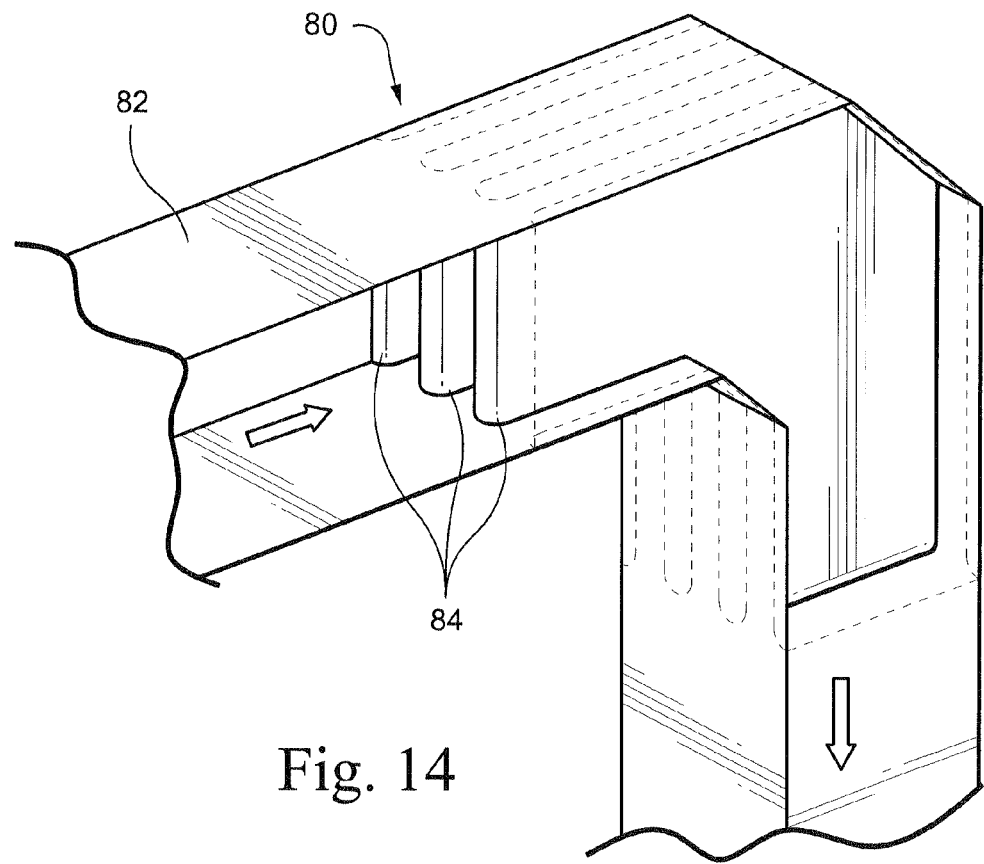
FIG. 14 schematically depicts a perspective view of a duct elbow including L-type silencer baffles according to another embodiment of the invention.

Referring to FIG. 14, a duct 82 includes a duct elbow 80 having a plurality of L-type inverted silencer baffles 84. The baffles 84 have equal lengths and may extend an equal distance into the first, horizontal portion of the duct and the second, vertical portion of the duct.

The embodiments described herein provide a reduction in the pressure drop and provide improved acoustic performance. The embodiments described herein also provide cost savings in steel liner material of the ducts and savings on insulation of the ducts. Furthermore, the embodiments described herein reduce associated support structure, such as bolts, spacebars, and stiffeners.

The silencer vane configurations disclosed herein provide reduction in the length of inlet and exhaust ducts and associated support structure. The silencer configurations as disclosed herein reduce pressure losses in the inlet and exhaust ducts, thereby increasing plant output. Only one stage of silencers in the duct is sufficient to provide required acoustic performance for a wide range of frequencies.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:
1. A silencer for a gas turbine, comprising:
a first duct portion;
a second duct portion connected to the first duct portion, the first and second duct portions forming an elbow region at the connection, the elbow region having an inlet plane and an outlet plane that are perpendicular to one another; and a plurality of elbow shaped vanes provided in the elbow region, each vane being symmetrical about a line of symmetry extending through the elbow region at an angle to the inlet and outlet planes, wherein the elbow region has a first flow path region having a cross section corresponding to a cross section of the first duct portion at the connection, a second flow path region defined by the plurality of elbow shaped vanes that have equal lengths and are spaced equally apart, and a third flow path region having a cross section corresponding to a cross section of the second duct portion at the connection.

2. A silencer according to claim 1, wherein the first duct portion comprises an inlet and a transition region between the inlet and the plurality of elbow shaped vanes, and a cross section of the transition region increases from the inlet towards the connection.

3. A silencer according to claim 2, wherein the first duct portion comprises a portion of constant cross section between the transition region and the inlet plane.

4. A silencer according to claim 2, wherein the inlet comprises a circular duct, a rectangular duct, or a square duct.

5. A silencer according to claim 1, wherein the second duct portion comprises an exhaust chimney and a transition region between the plurality of elbow shaped vanes, and a cross section of the transition region decreases from the outlet plane to the exhaust chimney.

6. A silencer according to claim 5, wherein the exhaust chimney comprises a circular duct, a rectangular duct, or a square duct.

7. A silencer according to claim 1, wherein each elbow shaped silencer vane extends an equal distance into the first duct portion and the second duct portion.

8. A silencer according to claim 1, wherein the plurality of elbow shaped vanes are supported by a corresponding plurality of slots in a side wall of the elbow region.

9. A silencer according to claim 1, wherein the first duct portion is disposed substantially horizontally and the second duct portion is disposed substantially vertically and the plurality of elbow shaped vanes provided in the elbow region attenuate a sound of a flow as it turns from horizontal to vertical.

10. A silencer according to claim 1, wherein the plurality of elbow shaped vanes are parallel to each other.

11. A silencer according to claim 10, wherein each elbow shaped vane extends in a direction transverse to a direction of a flow of exhaust gas in the the first and second duct portions.

12. A silencer according to claim 10, wherein each elbow shaped vane extends in a direction parallel to a flow of exhaust gas in the direction of a the first and second duct portions.

13. A silencer according to claim 1, wherein each elbow shaped vane comprises at least one sheet of sound attenuating material.

14. A silencer according to claim 13, wherein the at least one sheet is perforated.

15. A silencer according to claim 1, wherein each vane includes first and second portions that are symmetrical about the line of symmetry, and the first and second portions are perpendicular to each other.

16. A silencer for a gas turbine, comprising:

a first duct portion;

a second duct portion provided at an angle to the first duct portion, the first and second duct portions forming an elbow region at an intersection of the first and second duct portions, the elbow region having an inlet plane and an outlet plane that are not parallel to each other; and a plurality of elbow shaped vanes provided in the elbow region each vane being symmetrical about a line of symmetry extending through the elbow region at an angle to the inlet and outlet planes, wherein the plurality of elbow shaped vanes have equal lengths and are spaced equally apart.

17. A silencer according to claim 16, wherein the inlet and outlet planes are perpendicular to each other.

18. A silencer according to claim 16, wherein the plurality of vanes extend in a direction traverse to a direction of a flow of exhaust gas in the first and second duct portions.

19. A silencer according to claim 16, wherein the plurality of elbow shaped vanes are supported by a corresponding plurality of slots in a side wall of the elbow region.

20. A silencer according to claim 16, wherein each vane includes first and second portions that are symmetrical about the line of symmetry, and the first and second portions are perpendicular to each other.

* * * * *